Sept. 4, 1923.　　　　　　　　　　　　　　　　1,467,163
R. HUGERSHOFF
AUTOMATIC PROTRACTING APPARATUS COMBINED WITH TWO COMPUTING THEODOLITES
Filed Nov. 9, 1920　　　　　　4 Sheets-Sheet 1

Inventor:
Reinhard Hugershoff
By Ohmus L. Porro
Atty.

Sept. 4, 1923.

R. HUGERSHOFF 1,467,163

AUTOMATIC PROTRACTING APPARATUS COMBINED WITH TWO COMPUTING THEODOLITES

Filed Nov. 9, 1920 4 Sheets-Sheet 3

Inventor:
Reinhard Hugershoff,
by
Attorney

Sept. 4, 1923.                                          1,467,163
R. HUGERSHOFF
AUTOMATIC PROTRACTING APPARATUS COMBINED WITH TWO COMPUTING THEODOLITES
Filed Nov. 9, 1920                4 Sheets-Sheet 4
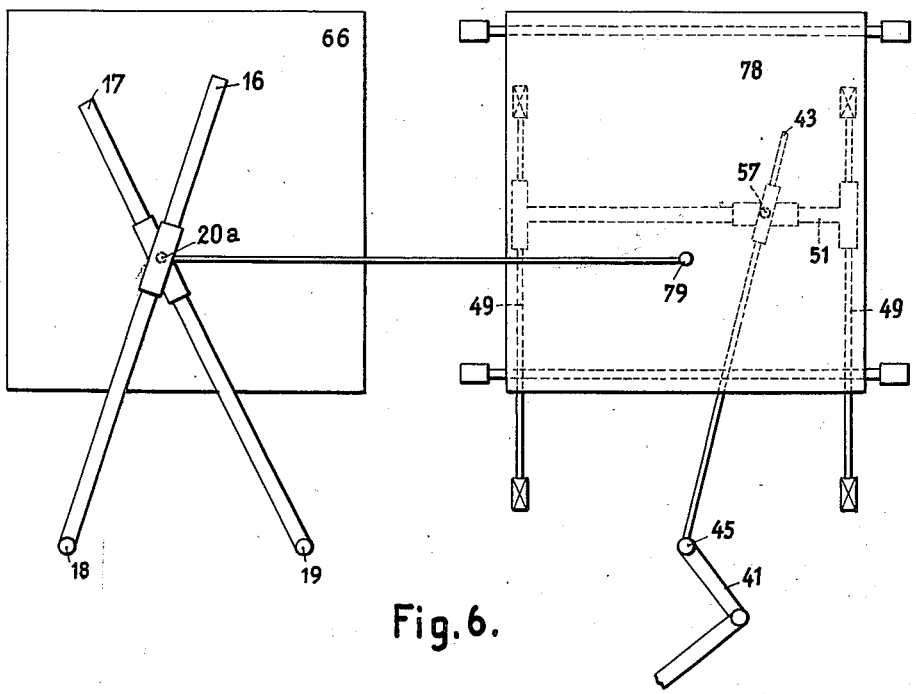
Fig. 6.
Fig. 7.
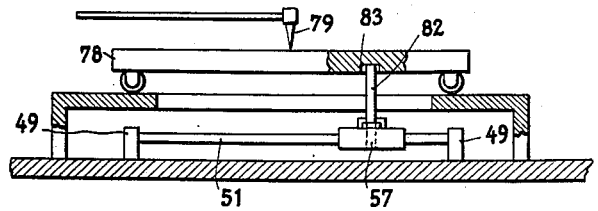
Inventor:
Reinhard Hugershoff,
by
Attorney Patented Sept. 4, 1923.

1,467,163

UNITED STATES PATENT OFFICE.

REINHARD HUGERSHOFF, OF THARANDT, NEAR DRESDEN, GERMANY.

AUTOMATIC PROTRACTING APPARATUS COMBINED WITH TWO COMPUTING THEODOLITES.

Application filed November 9, 1920. Serial No. 422,945.

*To all whom it may concern:*

Be it known that I, REINHARD HUGERSHOFF, a citizen of the German Republic, residing at Tharandt, near Dresden, Germany, have invented certain new and useful Improvements in Automatic Protracting Apparatus Combined with Two Computing Theodolites, of which the following is a specification.

The invention relates to a protracting apparatus of the kind, as described in U. S. Patent application Serial No. 336,229, filed November 6, 1919. In this known protracting apparatus the image carriers each can be turned around only one (horizontal) axis. Furthermore in this known apparatus the rulers serving for protracting the horizontal directions as well as the ruler, which reproduces the depth angle transposed into the horizontal, are operatively coupled to the observing telescopes of the two computing theodolites or to one of the two telescopes respectively. As the aiming axes of these telescopes can occupy the most variable positions in regard to each other after the same image point has been adjusted on each of the two plates, in the mentioned protracting apparatus a simultaneous observation by a single observer is not possible and the production of the maps or planes and especially of the layer lines (Isohypses) can take place only by mapping a series of points.

The novel protracting apparatus of this invention is differentiated from the known apparatus in, that the image carriers of the two computing theodolites can be turned around two axes, a horizontal one and a vertical one. The image carriers may be equipped with lenses or can be without them, as described in the above named application. The last named construction has the advantage, that in the same the continued correction or adjustment in regard to precision of focus of the image is not necessary. Furthermore the observing telescopes, instead of being connected with each other, are mounted unchangeably horizontally, and are arranged between the image carriers of the computing theodolites, so that the same observer can observe binocularly both photograms at the same time.

With the novel instrument it is possible, to compute any desired profiles through the exposed object from photograms and to protract the same directly in a graphical manner. This is effected through one or two drums, mounted above one of the altitude rulers, a drawing surface is guided, on which an altitude drawing pencil indicates the differences of altitude, while the profile drawing surface is displaced by means of an operative connection with a drag-roller in proportion to the course covered by the drawing pencil.

In the accompanying drawings:

Fig. 1 is a plan view and partly horizontal section of apparatus.

Fig. 2 a vertical section through the lenses of the image carrier.

Fig. 3 a plan view and Fig. 4 a side view of the arrangement by means of which any desired profiles can be computed through the exposed object from the photograms and can be directly protracted in a graphical manner.

Fig. 6 is a view of the subject matter of the invention, corresponding to Fig. 3, in which view a second drawing board, which is displaceably in lateral direction, is provided.

Fig. 7 is a section of Fig. 6.

Figure 2:
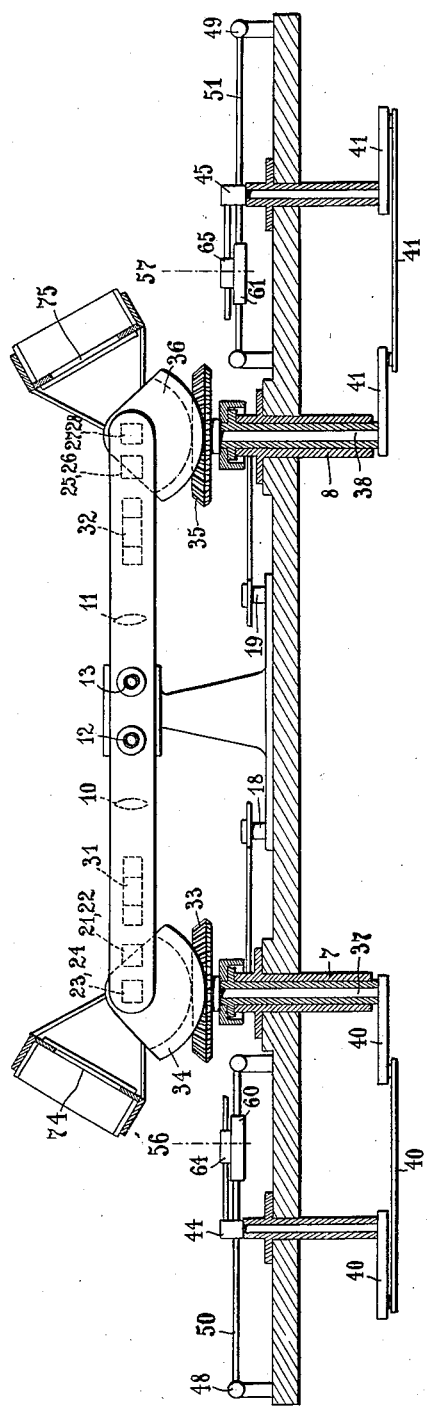

1 and 2 indicate the lenses of the two image carriers 3 and 4, which as mentioned before, can be turned both on the horizontal shafts 5, 5 or 6, 6, respectively, and on the vertical shafts 7 or 8 respectively, the axes of said shafts passing through the center of the objectives 1, 2 on the image carriers. The movement of the image carriers on their horizontal shafts are necessary in order to give to the photograms the same inclination which they had at the moment of the exposure (see Fig. 2). The movement on the vertical axes is made for measuring the horizontal angles. 9 indicates the telescope casing having two objectives 10 and 11 and two oculars 12 and 13. The horizontal movements of both image carriers, which movements correspond exactly to the horizontal angle deviations of the adjusted image points from the center lines of the images, are operatively transmitted in a known manner, in the present case by means of the levers $14^a$, $14^b$ and $15^a$, $15^b$ to the direction rulers 16 and 17, which are connected by the pivot pins 18 and 19 to the levers $14^b$ and $15^b$, respectively. Both rulers are connected by a two-part slide device 20, the two parts of which turn around the pin 20ª. In the extension of the pin 20ª a drawing pencil is provided at the lower side of the slide device, by means of which pencil the horizontal position of that point is determined, the two images of which are adjusted by turning of the image carrier and are simultaneously observed in the oculars 12 and 13.

In this operation the line of connection of the two pivot pins 18 and 19 represents the horizontal projection of the exposure basis and it is assumed, that the directions in which the two photograms 44 and 45 have been exposed, were standing exactly vertically to that basis.

Figure 1:
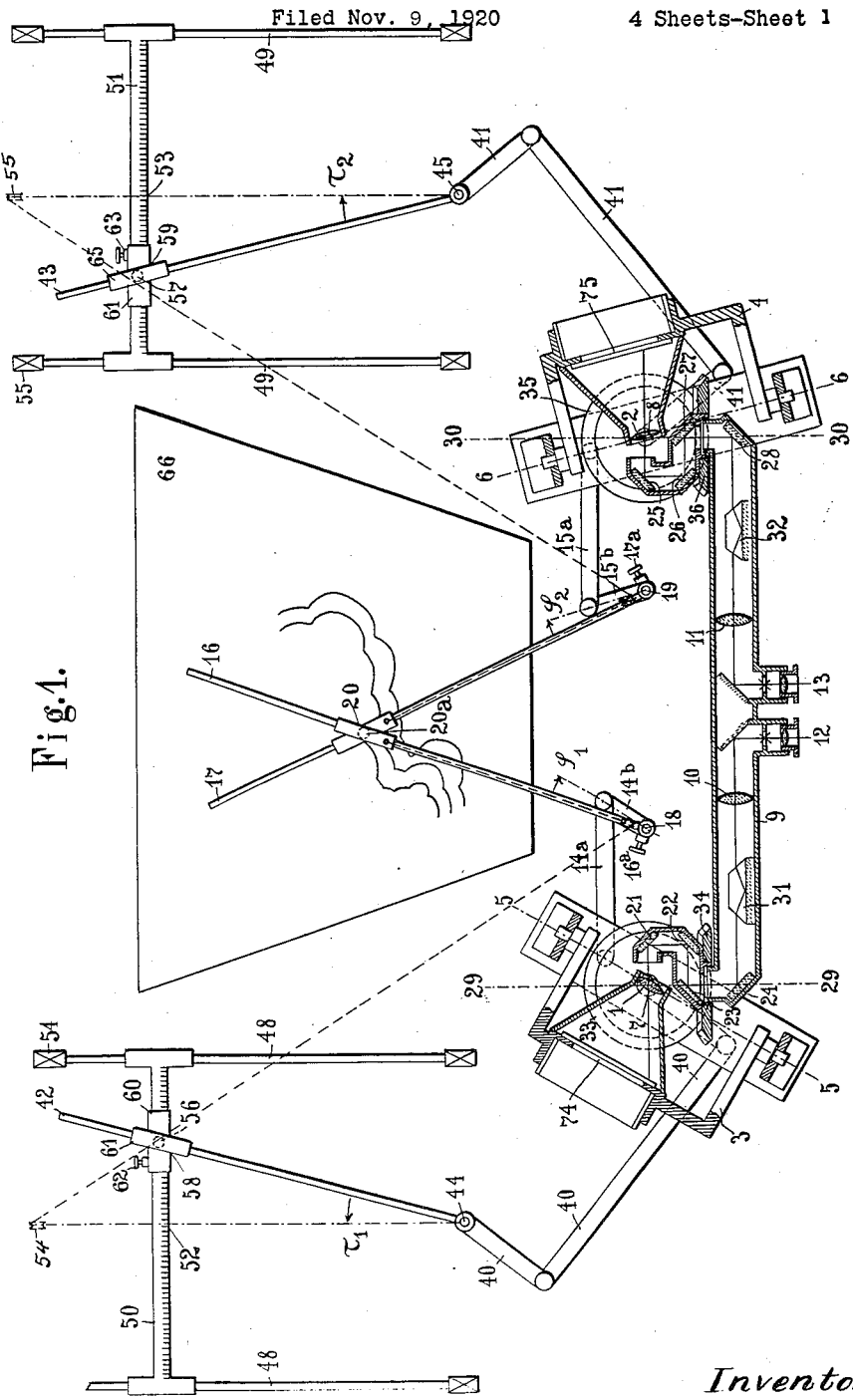

If the exposures deviate for the amount of the angles $\tau_1$ and $\tau_2$ from these normal directions, the horizontal rulers must be adjusted, before the commencement of the cartographic work, by the amount of the above mentioned angles in relation to the lever arms 14ᵇ or 15ᵇ respectively (see Fig. 1). For the purpose of enabling this adjustment, the rulers 16 and 17 can be rotated on their pivot pins 18 and 19 and can be rigidly connected again with these pivot pins, after the necessary adjustment, by means of the set screws 16ª and 17ª.

The adjustment of the image points in regard to their elevation is effected by the partially tiltable systems of mirrors or prisms (in the example shown as system or mirrors) 21, 22, 23 and 24 or 25, 26, 27 and 28 respectively. The mirrors 21, 22, 23 and 25, 26, 27 respectively are rigidly connected with each other. Their settings can be tilted around the horizontal axes 29 and 30, passing through the front main points of the image carrier objectives 1 and 2. The mirrors 24 and 28 are rigidly and immovably connected to the telescope casing 9, so that at the tilting of the systems 21, 22, 23 and 25, 26 27 all image points of the photogram, which lie above each other in a vertical line, appear successively in the field of view of the oculars. The distorted appearance of the images as produced by the rotation of the mirror systems can be obviated by interposing rotating Dove prisms 31 and 32 in the courses of the rays. The tilting movement of both inlet reflectors 21, 22, 23 and 25, 26, 27 respectively around their horizontal axes is also operatively transmitted by means of the gear wheels 33, 34 and 35, 36 respectively to the vertical shafts 37 and 38, which are guided in bores of the shafts 7 and 8. (See Fig. 2.) To the shafts 37 and 38 the lever systems 40 and 41 are secured, which transmit the tilting movement of the mirrors to the altitude rulers 42 and 43, which turn around the pins 44 and 45. The arrangement is made in such a manner, that at horizontal vision the altitude rulers point in the direction 44/46 or 45/47 respectively. With the aid of the altitude rulers the difference of elevation of the point adjusted on both measuring plates 74 and 75 in relation to the standpoint when the photogram was taken or directly to the height of the respective point above the sea level can be determined in a double manner.

In order to obtain this result, the guide rods 48, 48 and 49, 49 are arranged parallel to the directions 44/46 or 45/47 respectively. Upon said guide rods the altitude bridges 50 and 51 are sliding mounted to slide, and the altitude bridges 50 and 51 are provided with slidable, graduated scales, so that at the intersections 52 or 53 of the directions 44/46 or 45/47 respectively with the graduated edge of the bridge the actual elevation of the respective exposure above sea level can be read off. The altitude bridges are connected by means of constantly tensioned wires, which are connected to the device 20 and are guided on rollers at the points 18, 54 and 19, 55 respectively, to the drawing pencil 20 in such a manner, that the distance 44/52 is always equal to the distance 18/20 and the distance 45/53 is always equal to the distance 19/20. As now the altitude rulers 42 and 43 with the directions 44/46 or 45/47 respectively always reproduce the angles of elevation $\tau_1$ or $\tau_2$ respectively of the image points, the distance 52/56 or 53/57 is equal to 18/20 tang $\tau_1$ respectively equal to 19/20 tang $\tau_2$ accordingly equal to the difference or altitude of the tract point, graphically determined in 20ª, and the altitude of the standpoint at which the exposure was made. Accordingly the elevation of the tract points above the sea level can be directly read off of the points 56 or 57 respectively of the graduations of the altitude bridges 50 or 51 respectively.

A further arrangement now permits, to fix each altitude ruler to a certain elevation above the sea level by means of the two-part articulated slide bodies 58 and 59. For this purpose the lower part 60 or 61 respectively of each slide body is clamped to the altitude bridge by means of the screws 62 or 63 respectively, while the upper parts 64 or 65 respectively can freely rotate and permits a sliding therethrough of the altitude ruler. At the advancing or returning sliding movement of the bridges 50 and 51 the reading off of the elevation remains always the same, while the angle between the altitude rulers and the directions 44/46 or 45/47 continually changes.

When now both altitude rulers are adjusted to the same elevation above sea level and the slide bodies 58 or 59 respectively are clamped in the manner described, upon rotation of the two image carriers 3, 4 around the shafts 7, 8, the two inlet reflectors 21, 22, 23 or 25, 26, 27 respectively will operatively perform a tilting movement in such a manner, that the aiming mark of the binocular (stereoscopical telescope) apparently remains always in a horizontal plane the observed field. When the image carriers are moved in such a manner, that the aiming mark slides along the stereoscopically viewed tract, the pencil 20 will automatically indicate on the drawing board 66 the line of intersection of that horizontal plane with the tract, that means a predetermined curve of elevation (Isohypse).

Figure 3:
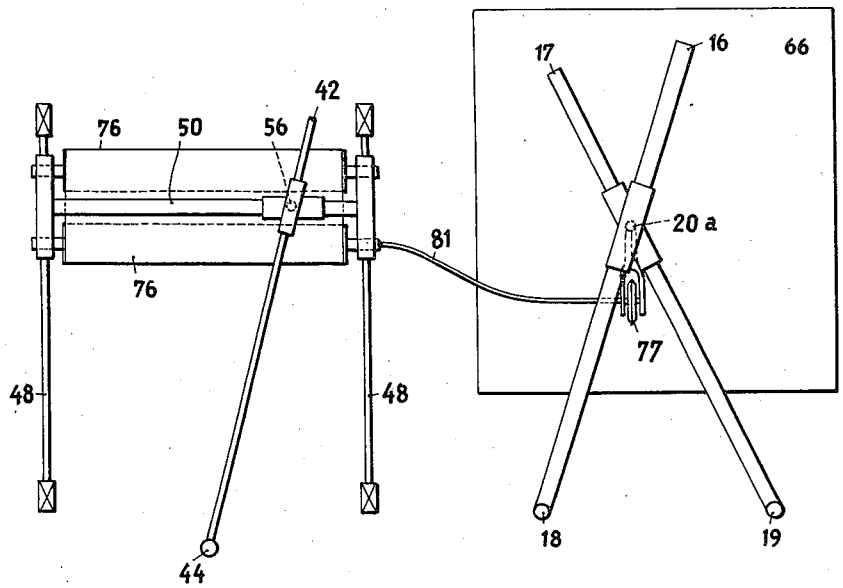
Figure 4:
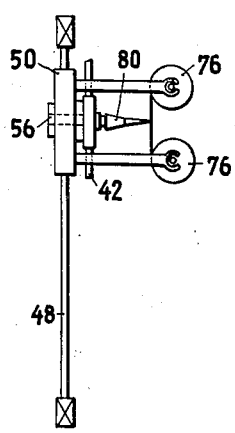
Figure 5:
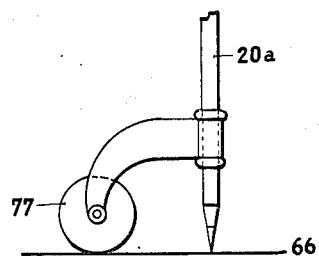
Fig. 5 shows a detail of construction.

With the before described instrument it is further possible, to compute any desired profiles through the exposed object from the photograms and to protract the same directly in a graphical manner. This is done by means of a drawing surface (see Figs. 3 and 4) provided above or below one of altitude bridges or rails 50 or 51 respectively, and a pencil 80 secured in a slide bolt 56 for engagement with said drawing surface. This pencil 80 will continuously indicate the difference of altitude 52/56 or 53/57 respectively. When said pencil in this connection shall draw a profile, obviously the drawing surface must be slidable vertically and relatively to the altitude bridge and said drawing surface must be continuously displaced for the same distances, which the pencil 20$^a$ covers on the drawing surface 66. In order to obtain this result the profile drawing surface is guided upon one or two drums 76, the shaft or shafts respectively of which are mounted parallel to the altitude bridge 50 or 51 respectively. Further a drag-roller 77 (Fig. 5) is provided on the pencil 20$^a$ of the horizontal rulers, the blade-like periphery of said roller moving upon the drawing surface 66, so that the number of revolutions of said roller is in proportion to the course covered by the pencil 20$^a$. The horizontal pivot pin of this drag-roller 77 is operatively connected with the shaft of one of the drums 76. The coupling can be effected by means of a flexible shaft 81 in a mechanical manner, or otherwise in an electromechanical manner.

It may be pointed out here, that the described profile arrangement permits also the protracting of such profiles, in which the altitudes or elevations are to be protracted or another (mostly larger) scale than the horizontal lengths of said profiles. For this purpose the profile surface drums must be mounted on the altitude bridges 50 or 51 respectively in such a manner that they can slide laterally, that is in the direction of their axis of rotation; and that means be provided for a displacement or sliding movement of the altitude pencils 56 or 57 respectively by simple mechanical means also a simultaneous proportional displacement of said drums together with their bearing means.

The subject matter of this application finally can serve also for the production of stereoscopically acting topographical plans according to application Serial No. 471,039 filed October 14, 1920. By the apparatus forming the subject matter of said last named application from and existing topographical plan a copy of equal size is produced by means of a pantograph or similar arrangement; the drawing surface for said copy during the production of the same being displaced in the very same direction proportionally to the altitude due to the just drawn line element. Thereby a "parallactic transformation" of the original plan is produced. Both plans, suitably reduced, afford at the observation through the stereoscope a plastic image of the formations of the respective tract.

In order to produce such parallactic transformations simultaneously with the plans to be developed from the photograms, according to the present invention a second braid 78 is provided abreast of the drawing board proper 66 of equal size to the latter and located above the right hand altitude arrangement, upon which second board a second pencil 70, rigidly connected to the pencil 20$^a$, is held in sliding relation thereto. This second pencil accordingly per se will draw a congruent plan. The second drawing surface is mounted in such a manner, that it can be displaced only in one direction and is by simple mechanical means operatively connected to the slide bolt 57 of the left hand altitude ruler 43, such connection being effected by the pin 82 secured to the slide bolt 57, which pin slides in a groove 83, arranged at the lower side of the drawing board vertically to the direction of displacement of the same.

Having thus particularly described the nature of my invention, what I claim as new and desire to secure by Letters Patent of the United States is:

1. Automatic protracting apparatus combined with two computing theodolites, comprising in combination a binocular double telescope, a pair of rotatable systems of mirrors arranged at opposite ends with said telescope and in operative relation thereto, a pair of image carriers supported adjacent the ends of said telescope, said image carriers being rotatable about vertical and horizontal axes, measuring plates carried by said image carriers, an objective lens mounted upon each of said carriers for throwing the image of the measuring plate into the rotatable system of mirrors, means for operating said image carriers and means for rotating said system of mirrors to effect the simultaneous adjustment of the identical image points on said measuring plates.

2. Automatic protracting apparatus combined with two computing theodolites, comprising in combination a binocular double telescope, a pair of rotatable systems of mirrors arranged at the opposite ends of said telescope and in operative relation thereto, a pair of image carriers supported adjacent the ends of said telescope, said image carriers being rotatable about vertical and horizontal axes, measuring plates carried by said image carriers, an objective lens mounted on each of said carriers for throwing the image of said measuring plates into the rotatable system of mirrors, means for operating said image carriers, means for rotating said system of mirrors to effect the simultaneous adjustment of the identical image points in said measuring plates, a pair of direction rulers and a pair of altitude rulers, said pairs of direction and altitude rulers being respectively coupled to the image carriers and to the rotatable mirror systems for the purpose of effecting an automatic and continuous protracting of layer lines.

3. Automatic protracting apparatus commined with two computing theodolites, comprising in combination a binocular double telescope, a pair of rotatable systems of mirrors arranged at opposite ends with said telescope and in operative relation thereto, a pair of image carriers supported adjacent the ends of said telescope, said image carriers being rotatable about vertical and horizontal axes, measuring plates carried by said image carriers, an objective lens mounted upon each of said carriers for throwing the image of the measuring plate into the rotatable system of mirrors, means for operating said image carriers, means for rotating said system of mirrors to effect simultaneous adjustment of the identical image points on said measuring plates, a pair of direction rulers and a pair of altitude rulers, said pairs of rulers being operatively coupled respectively to the image carriers and to the rotatable system of mirrors, a main drawing surface, a profile drawing surface, drums mounted upon one of the altitude rulers about which said profile surface is guided, a pencil associated with said altitude ruler indicating on said profile drawing surface the differences of elevation, a pencil associated with said direction rulers for cooperation with said main drawing surface, a drag roller attached to said pencil and an operative connection between the profile drawing surface and said drag roller for the purpose of displacing said profile drawing surface in proportion to the distance covered by said pencil.

4. Automatic protracting apparatus combined with two computing theodolites, comprising in combination a binocular double telescope, a pair of rotatable systems of mirrors arranged at opposite ends with said telescope and in operative relation thereto, a pair of image carriers supported adjacent the ends of said telescope, said image carriers being rotatable about vertical and horizontal axes, measuring plates carried by said image carriers, an objective lens mounted upon each of said carriers for throwing the image of the measuring plate into the rotatable system of mirrors, means for operating said image carriers, means for rotating said system of mirrors to effect a simultaneous adjustment of the identical image points on said measuring plates, a pair of direction rulers and a pair of altitude rulers, said pairs of rulers being operatively coupled respectively to the image carriers and to the rotatable system of mirrors, a main drawing board, a profile drawing surface, drums mounted upon one of the altitude rulers about which said profile surface is guided, a pencil associated with said altitude ruler indicating on said profile drawing surface the differences of elevation, a pencil associated with said direction rulers for cooperation with said main drawing surface, a drag roller attached to said pencil, an operative connection between the profile drawing surface and said drag roller for the purpose of displacing said profile drawing surface in proportion to the distance covered by said pencil, a second drawing board in operative relation to the other of said altitude rulers, and means connecting said direction rulers to said second drawing board.

In testimony whereof I have hereunto set my hand in presence of two subscribing witnesses.

Dr. REINHARD HUGERSHOFF.

Witnesses:
 Julius Heyde,
 Johannes Heyde.